US010069661B2

(12) United States Patent
Han et al.

(10) Patent No.: US 10,069,661 B2
(45) Date of Patent: Sep. 4, 2018

(54) COMMUNICATION METHOD AND COMMUNICATION NODE FOR DEVICE-TO-DEVICE DIRECT COMMUNICATION (71) Applicant: Beijing Zhigu Rui Tuo Tech Co., Ltd, Beijing (CN)

(72) Inventors: Shengqian Han, Beijing (CN); Pan Chen, Beijing (CN); Chenyang Yang, Beijing (CN); Weicai Huang, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/314,925

(22) PCT Filed: Apr. 30, 2015

(86) PCT No.: PCT/CN2015/077990
§ 371 (c)(1),
(2) Date: Nov. 29, 2016

(87) PCT Pub. No.: WO2015/180553
PCT Pub. Date: Dec. 3, 2015

(65) Prior Publication Data
US 2017/0250842 A1 Aug. 31, 2017

(30) Foreign Application Priority Data

May 30, 2014 (CN) .......................... 2014 1 0240237

(51) Int. Cl.
H04M 1/00 (2006.01)
H04L 25/08 (2006.01)
(Continued)

(52) U.S. Cl.
CPC ........... *H04L 25/08* (2013.01); *H04B 17/336* (2015.01); *H04L 5/14* (2013.01); *H04L 25/0224* (2013.01);
(Continued)

(58) Field of Classification Search
CPC ....... H04L 25/08; H04L 5/14; H04L 25/0224; H04B 17/336; H04W 76/043; H04W 88/08
See application file for complete search history.

(56) References Cited

U.S. PATENT DOCUMENTS

2008/0151089 A1  6/2008 Street et al.
2009/0325625 A1  12/2009 Hugl et al.
(Continued)

FOREIGN PATENT DOCUMENTS

CN  101500246 A  8/2009
CN  103117757 A  5/2013
(Continued)

OTHER PUBLICATIONS

International Search Report for PCT Application No. PCT/CN2015/077990, dated Aug. 5, 2015, 3 pages.
(Continued)

*Primary Examiner* — Xin Jia
(74) *Attorney, Agent, or Firm* — Amin, Turocy & Watson, LLP (57) ABSTRACT Embodiments of the present application disclose a communication method and a communication node for device-to-device (D2D) direct communication, and relate to the field of D2D technologies. The method comprises: receiving, by a first node, an interference signal from an interference node; and sending, by the first node, the interference signal and a to-be-sent signal in a manner in which the interference signal and the to-be-sent signal can be received by at least
(Continued)

one second node. The communication method and the communication node in the embodiments of the present application can effectively reduce interference of a cellular network on D2D communication. By using the communication method and the communication node in the embodiments of the present application, a base station resource does not need to be consumed, and signaling interactions are fewer, which help to improve the resource utilization.

32 Claims, 6 Drawing Sheets

(51) Int. Cl.

| | | |
|---|---|---|
| *H04W 76/04* | (2009.01) | |
| *H04L 5/14* | (2006.01) | |
| *H04L 25/02* | (2006.01) | |
| *H04B 17/336* | (2015.01) | |
| *H04W 76/23* | (2018.01) | |
| *H04W 88/08* | (2009.01) | |

(52) U.S. Cl.
CPC ......... *H04W 76/043* (2013.01); *H04W 76/23* (2018.02); *H04W 88/08* (2013.01)

(56) References Cited

U.S. PATENT DOCUMENTS

| | | | | |
|---|---|---|---|---|
| 2012/0120938 | A1* | 5/2012 | Mueck | G01S 5/0045 370/338 |
| 2013/0027581 | A1 | 1/2013 | Price et al. | |
| 2013/0102305 | A1* | 4/2013 | Liu | H04W 24/02 455/422.1 |
| 2013/0322276 | A1* | 12/2013 | Pelletier | H04W 72/085 370/252 |
| 2014/0219449 | A1* | 8/2014 | Shattil | H04W 12/08 380/270 |
| 2015/0049736 | A1* | 2/2015 | Liu | H04W 72/04 370/331 |
| 2015/0333844 | A1* | 11/2015 | Kim | H04B 7/0413 455/63.1 |

FOREIGN PATENT DOCUMENTS

| | | |
|---|---|---|
| CN | 103384161 A | 11/2013 |
| CN | 103781050 A | 5/2014 |
| CN | 104038456 A | 9/2014 |

OTHER PUBLICATIONS

Ashok A, Gruteser M, Mandayam N, et al. "Challenge: mobile optical networks through visual mimo" Proceedings of the sixteenth annual international conference on Mobile computing and networking. ACM, 2010: 105-112. Retrieved Sep. 23, 2016, 8 pages.

Jaehyuk Choi, Sang-Wook Han, Seong-Jin Kim, Sun-II Chang, Euisik Yoon, "A Spatial-Temporal Multi-Resolution CMOS Image Sensor with Adaptive Frame Rates for Moving Objects in the Region-of-Interest" 2007 IEEE International Solid-State Circuits Conference, published online at [http://www.ece.umn.edu/groups/iml/publications/2007/ISSCC_Jchoi.pdf]. Retrieved Sep. 23, 2016, 3 pages.

"Living Image® Software User's Manual" Version 4.2, Caliper LifeSciences, © 2002-2011 Caliper Corporation, PN 133026 Rev 00, published online at [http://www2.udel.edu/ctcr/sites/udel.edu.ctcr/files/Living_Image_4-2_User_Guide. pdf]. Retrieved Sep. 23, 2016, 344 pages.

Ng, Tse Nga and Wong, William S. and Chabinyc, Michael L. and Sambandan, Sanjiv and Street, Robert A., "Flexible image sensor array with bulk heterojunction organic photodiode", Applied Physics Letters, 92, 213303 (2008). Retrieved Sep. 23, 2016, 344 pages.

Ko, Heung Cho, et al. "A hemispherical electronic eye camera based on compressible silicon optoelectronics." Nature 454.7205 (Aug. 2008): 748-753. Retrieved Sep. 23, 2016, 6 pages.

Bar-Cohen, Yoseph. "Electroactive polymers for refreshable Braille displays". SPIE. Sep. 11, 2009. Retrieved Sep. 23, 2016, 3 pages.

Yanlei Yu, Makoto Nakano and Tomiki Ikeda, "Photomechanics: Directed bending of a polymer film by light", Nature 425, 145 (Sep. 11, 2003) | doi:10.1038/425145a. Retrieved Sep. 23, 2016, 1 page.

\* cited by examiner

COMMUNICATION METHOD AND COMMUNICATION NODE FOR DEVICE-TO-DEVICE DIRECT COMMUNICATION

RELATED APPLICATION

The present application is a U.S. National Stage filing under 35 U.S.C. § 371 of international patent cooperation treaty (PCT) application No. PCT/CN2015/077990, filed Apr. 30, 2015, and entitled "COMMUNICATION METHOD AND COMMUNICATION NODE FOR DEVICE-TO-DEVICE DIRECT COMMUNICATION", which claims priority to Chinese Patent Application No. 201410240237.7, filed with the Chinese Patent Office on May 30, 2014, which applications are hereby incorporated herein into the present application by reference in their respective entireties.

TECHNICAL FIELD

The present application relates to the field of device-to-device (D2D) direct communications technologies, and in particular, to a communication method and a communication node for D2D direct communication.

BACKGROUND

In recent years, D2D communication in a traditional cellular network attracts widespread attention. In the D2D communication, a user equipment (UE) can communicate with another UE by means of a base station, and can also directly connect to and communicate with the another UE. The D2D communication can improve network performance: Spectrum utilization is improved, better coverage is implemented, and congestion is alleviated. Moreover, user experience can be improved due to a higher data rate, lower power consumption, and less serious congestion.

Figure 1A:
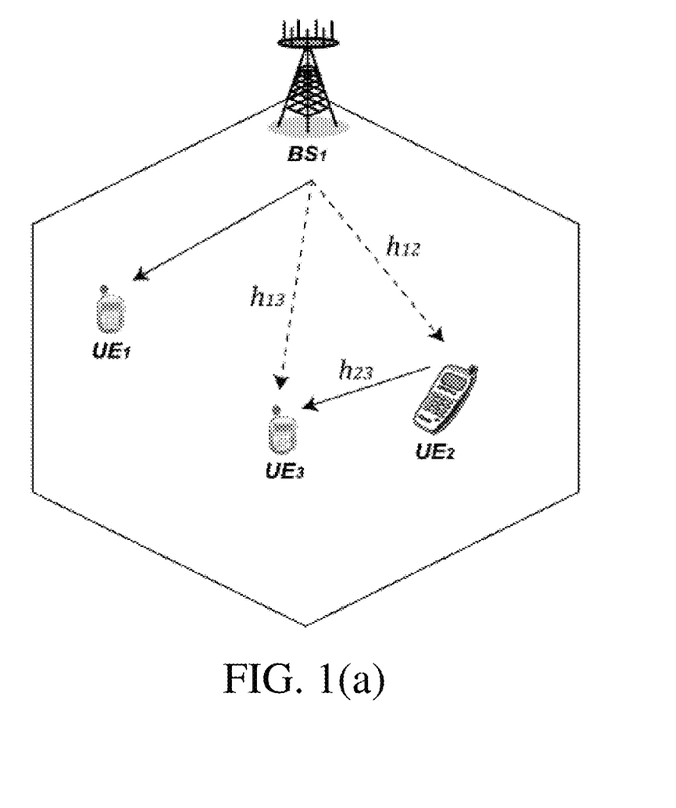
FIG. 1(a) is an example schematic diagram of a downlink interference scenario.
Figure 1B:
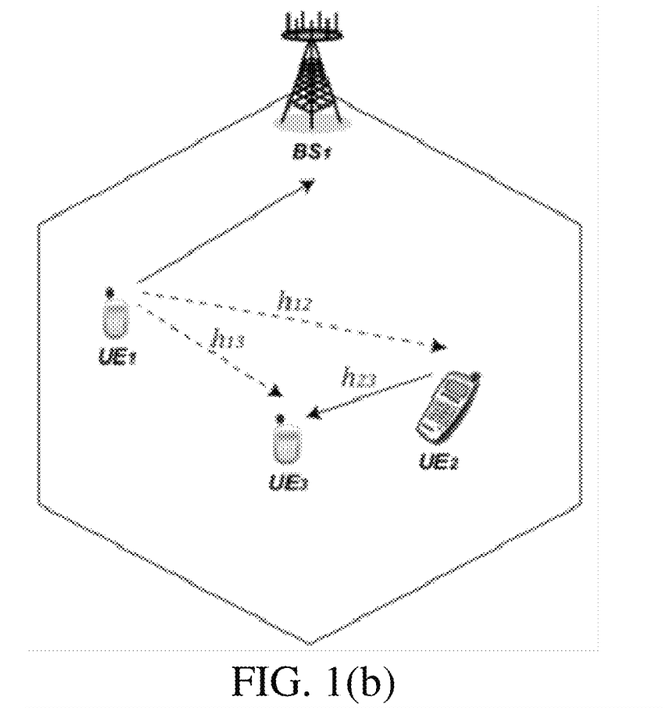
FIG. 1(b) is an example schematic diagram of an uplink interference scenario.

However, it is a challenge to obtain the foregoing benefits because interference exists between a cellular network and a D2D link. For example, if a downlink resource of a cellular network is used in the D2D communication (in a time division duplexing (TDD) system, it means that the D2D communication occurs in a downlink timeslot, and in a frequency division duplexing (FDD) system, it means that the D2D communication occurs in a downlink frequency), a downlink signal of a base station of the cellular network interferes with a receiving D2D UE, where the interference in this case is referred to as downlink interference in this specification. As shown in FIG. 1(a), a UE1, a UE2, and a UE3 are all within a coverage range of a base station BS1, and the UE2 and the UE3 are a D2D communication pair. The UE2 occupies a cell downlink channel during transmission from the UE2 to the UE3, and in this case, a downlink signal transmitted from the base station BS1 affects receiving, by the UE3, a signal transmitted by the UE2. For another example, if an uplink resource of a cellular network is used in the D2D communication (in a TDD system, it means that the D2D communication occurs in an uplink timeslot, and in an FDD system, it means that the D2D communication occurs in an uplink frequency), an uplink signal from another UE to a base station of the cellular network interferes with a receiving D2D UE, where the interference in this case is referred to as uplink interference in this specification. As shown in FIG. 1(b), a UE1, a UE2, and a UE3 are all within a coverage range of a base station BS1, and the UE2 and the UE3 are a D2D communication pair. The UE2 occupies a cell uplink channel during transmission from the UE2 to the UE3, and in this case, an uplink signal transmitted from the UE1 to the base station BS1 affects receiving, by the UE3, a signal transmitted by the UE2.

SUMMARY

An example, non-limiting objective of the present application is to provide a communication method and a communication node for device-to-device (D2D) direct communication.

To these and/or related ends, in a first example aspect, an embodiment of the present application provides a communication method for D2D direct communication, where the method comprises:

receiving, by a first node, an interference signal from an interference node; and sending, by the first node, the interference signal and a to-be-sent signal in a manner in which the interference signal and the to-be-sent signal can be received by at least one second node.

In a second example aspect, an embodiment of the present application provides a communication node for D2D direct communication, where the communication node comprises:

a receiving module, configured to receive an interference signal from an interference node; and a sending module, configured to send the interference signal and a to-be-sent signal in a manner in which the interference signal and the to-be-sent signal can be received by at least one second node.

In a third example aspect, an embodiment of the present application provides a computer readable storage device, comprising at least one executable instruction, which, in response to execution, causes a system comprising a processor to perform operations, comprising:

receiving, by a first node, an interference signal from an interference node; and sending, by the first node, the interference signal and a to-be-sent signal in a manner in which the interference signal and the to-be-sent signal can be received by at least one second node.

In a fourth example aspect, an embodiment of the present application provides a device for device-to-device (D2D) direct communication, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

receiving, by a first node, an interference signal from an interference node; and sending, by the first node, the interference signal and a to-be-sent signal in a manner in which the interference signal and the to-be-sent signal can be received by at least one second node.

In the example communication methods and communication nodes in the example embodiments of the present application, an initiator of D2D communication acquires an interference signal, and sends the interference signal and a to-be-sent signal to a receiver of the D2D communication, to cause interference to be eliminated at the receiver, thereby effectively reducing interference of a cellular network on the D2D communication. By using the communication method and the communication node in the embodiments of the present application, a base station resource does not need to be consumed, and signaling interactions are fewer, which help to improve the resource utilization.

DETAILED DESCRIPTION

Example embodiments of the present application are described in further detail with reference to accompanying drawings (same reference numerals in the figures indicate same elements) and embodiments. The following embodiments are used to describe the present application, but are not intended to limit the scope of the present application.

In the embodiments of the present application, a "first node" and a "second node" are a D2D pair, where the "first node" is an initiator in D2D communication, and the "second node" is a receiver in the D2D communication; and the "first node" and the "second node" are UEs such as a mobile phone, a notebook computer, a vehicle-mounted device, and an intelligent device within a coverage range of a same base station. "First" and "second" are only used to distinguish roles in the D2D communication, and do not indicate that the nodes must have different functions. An "interference node" refers to a device interfering with (a time-frequency resource occupied by the D2D communication is the same as a radio resource used by the interference node) the D2D communication, and the device may be a base station itself and may also be another UE. For example, in a downlink interference scenario shown in FIG. 1(a), the interference node is a base station BS1 of a cellular network; and in an uplink interference scenario shown in FIG. 1(b), the interference node is another UE, namely, UE1, within a coverage range of the base station BS1.

Figure 2:
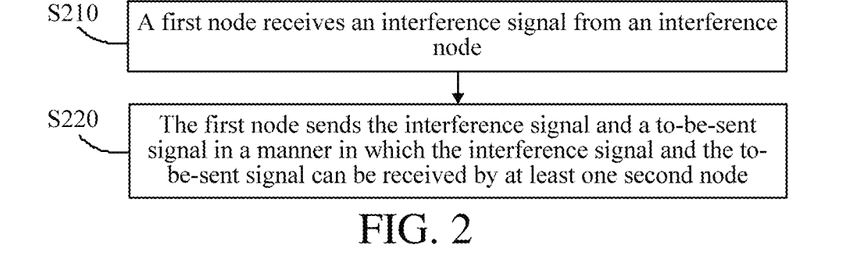
FIG. 2 is an example flowchart of a communication method for D2D direct communication according to an embodiment of the present application.

A method in an embodiment of the present application is executed by an initiator of the D2D communication, namely, the first node. As shown in FIG. 2, a communication method for D2D direct communication in an embodiment of the present application comprises:

S210: A first node receives an interference signal from an interference node.

S220: The first node sends the interference signal and a to-be-sent signal in a manner in which the interference signal and the to-be-sent signal can be received by at least one second node.

The interference signal is a signal that is from the interference node and received by the first node in a radio resource for sending the interference signal and the to-be-sent signal. The at least one second node can receive, in the radio resource, the interference signal and the to-be-sent signal sent by the first node, and can also receive the interference signal from the interference node. The interference signal and the to-be-sent signal sent by the first node may be used for interference elimination or the like at the second node.

It should be noted that, in the method in this embodiment of the present application, the first node is at least in a full-duplex mode in the radio resource for sending the interference signal and the to-be-sent signal (assuming that the first node has a transmit antenna and a receive antenna), so as to simultaneously transmit and receive a signal in a same radio resource, that is, receive the interference signal while sending a signal to the second node, thereby effectively improving the spectrum efficiency. In addition, to reduce a processing delay, after receiving the interference signal, the first node does not decode the interference signal.

In the method in this embodiment of the present application, an initiator of D2D communication acquires an interference signal, and sends the interference signal and a to-be-sent signal to a receiver of the D2D communication, to cause interference to be eliminated at the receiver, thereby effectively reducing interference of a cellular network on the D2D communication. The method in this embodiment of the present application does not need to consume a base station resource (for example, coordinating interference between a D2D link and a cellular network), has fewer signaling interactions, and does not reduce user performance of the cellular network, which help to improve the resource utilization.

In the method in this embodiment of the present application, to better implement interference elimination or the like at the second node, before S220, the method in this embodiment of the present application further comprises:

S230: Combine the interference signal and the to-be-sent signal.

During combination of the interference signal and the to-be-sent signal, a transmit power of the first node and a signal to interference plus noise ratio (SINR) at the second node may be comprehensively considered. In S220, a combined signal is sent in a manner in which the combined signal can be received by the at least one second node.

In a possible implementation, S230 further comprises:

S231: The first node separately determines a first channel characteristic $h_{12}$ of a first channel between the interference node and the first node, a second channel characteristic $h_{13}$ of at least one second channel between the interference node and the at least one second node, and a third channel characteristic $h_{23}$ of at least one third channel between the first node and the at least one second node, where the channel characteristic at least comprises a channel impulse response.

S232: The first node combines the interference signal and the to-be-sent signal according to the first channel characteristic $h_{21}$ the second channel characteristic $h_{13}$, and the third channel characteristic $h_{23}$.

In the method in this embodiment of the present application, under the condition of satisfying a maximum transmit power constraint of the first node, combination weights of the interference signal and the to-be-sent signal may be designed according to the first channel characteristic $h_{12}$, the second channel characteristic $h_{13}$, and the third channel characteristic $h_{23}$, so as to obtain a maximum SINR of the at least one second node.

In step S231, a direct channel user may determine a corresponding channel characteristic by using a common channel estimation algorithm in the field, and a non-direct user may acquire a corresponding channel characteristic from the direct channel user. For example:

In a possible implementation, in the downlink interference scenario shown in FIG. 1(a), a UE2 is the first node, a UE3 is the second node, and an interference node is the base station BS1. For the first channel characteristic $h_{12}$, the first node UE2 and the base station BS1 are direct users of the first channel, and the first node UE2 may determine the first channel characteristic $h_{12}$ by receiving a pilot signal of the base station BS1 to perform channel estimation. That is, step S231 comprises:

S2311: The first node determines the first channel characteristic $h_{12}$ according to a pilot signal from the base station.

In another possible implementation, in the uplink interference scenario shown in FIG. 1(b), a UE2 is the first node, a UE3 is the second node, and an interference node is another UE, namely, a UE1 shown in the figure, within a coverage range of the base station BS1. In this case, before performing D2D communication, the UE2 and the UE3 need to determine the interference node possibly interfering with the UE2 and the UE3, and determine each channel characteristic after determining the interference node. The UE2 may determine the interference node by directly querying the base station, and then perform channel estimation; or only perform channel estimation by using a received signal from the interference node without determining the interference node. For example, step S231 comprises:

S2311': The first node UE2 sends a request to a base station BS1 or listens for scheduling information of a base station BS1.

Because the D2D communication is controlled by a base station, a resource used in the D2D communication is allocated by the base station. Therefore, to determine the interference node and further determine the channel characteristic, the UE2 may send the request to the base station, or listen for the scheduling information, of the base station BS1, in a radio resource occupied by the D2D communication, so as to acquire related information that can be used to determine the interference node.

S2312': Acquire a reference signal parameter of a possible interference node.

The UE2 can learn the reference signal parameter by listening for the scheduling information of the base station BS1; or in response to the request of the UE2, the base station BS1 may send the reference signal parameter of the interference node to the UE2. The UE2 receives a reference signal of the interference node according to the parameter, and further performs channel estimation according to the reference signal. An example is used, but does not intend to constitute any limitation: The reference signal may be a channel sounding reference signal (SRS) in an LTE system, where the reference signal is a high-bandwidth sounding signal transmitted by the UE to the base station. Before sending an uplink signal to the base station, the UE sends an SRS to the base station according to an SRS parameter (comprising a sending cycle, frequency, or the like) specified by the base station; and the base station performs demodulation, channel state estimation, or the like according to the received SRS, so as to perform uplink scheduling. In step S2312', the first node acquires the SRS parameter sent by the base station.

S2313': Receive a reference signal from the interference node according to the parameter, and determine the first channel characteristic $h_{12}$ according to the reference signal.

For example, a signal received by the UE2 in a corresponding time-frequency resource according to the received SRS parameter is an SRS of the interference node, and the UE2 performs channel estimation according to the SRS to determine the first channel characteristic $h_{12}$.

It should be noted that, in a case in which the interference node is another UE, the reference signal parameter may also be acquired by the second node, and the first node acquires the parameter from the second node.

For the second channel characteristic $h_{13}$, the interference node and the at least one second node are direct users of the second channel, the at least one second node may determine the second channel characteristic $h_{13}$ according to step S2311' to 2313', and the first node acquires the second channel characteristic $h_{13}$ from the second node. Correspondingly, step S231 comprises:

S2314: Acquire the second channel characteristic $h_{13}$ from the at least one second node.

For the third channel characteristic $h_{23}$, the first node and the corresponding second node are direct users of the third channel. Because the first node and the corresponding second node are a D2D communication pair, after establishing a D2D connection, the first node may perform channel estimation according to a signal from the second node. Correspondingly, step S231 comprises:

S2315: The first node establishes a connection to the at least one second node.

S2316: The first node determines the third channel characteristic $h_{23}$.

In step S232, the weights of the interference signal and the to-be-sent signal may be determined according to the following formulas:

$$|w_1| = \frac{A + D - \sqrt{(A+D)^2 - \frac{AC^2}{B}}}{C} \text{ and} \quad (1)$$

-continued $$|w_2| = \sqrt{P_2 - |w_1^*|(P_1|h_{12}|^2 + \sigma_I^2 + \sigma_n^2)} \quad (2)$$

where, $A = P_2|h_{23}|^2$ $B = |P_1|h_{12}|^2|h_{23}|^2 + |h_{23}|^2(\sigma_I^2 + \sigma_n^2)$ $C = 2P_1|h_{12}||h_{13}||h_{23}|$ $D = P_1|h_{13}|^2 + \sigma_n^2$ and $w_1$ is a weight of the interference signal, $w_2$ is a weight of the to-be-sent signal, $P_1$ is a maximum transmit power of the interference node, $P_2$ is a maximum transmit power of the first node, $\sigma_I^2$ is a zero mean variance when self-interference modeling of the first node is additive white Gaussian noise, and $\sigma_n^2$ is a zero mean variance of additive white Gaussian noise of the first channel, where the two variances are known parameters for the first node. Correspondingly, step S232 comprises:

S2321: Acquire the maximum transmit power $P_1$ of the interference node.

S2322: Determine weights of the interference signal and the to-be-sent signal according to the maximum transmit power $P_1$ of the interference node, the maximum transmit power $P_2$ of the first node, the first channel characteristic $h_{12}$, the second channel characteristic $h_{13}$, and the third channel characteristic $h_{23}$.

S2323: Combine the interference signal and the to-be-sent signal according to the weights.

Regardless of whether the interference node is the base station or another UE, the first node may directly acquire $P_1$ from the base station; and therefore, in step S2321, the maximum transmit power $P_1$ is acquired by receiving the maximum transmit power $P_1$ of the interference signal from a base station of a cellular network.

After the weights are determined, and the interference signal and the to-be-sent signal are combined according to the weights, a combined signal may be sent to the corresponding second node.

A person skilled in the art can understand that sequence numbers of the steps in the foregoing method in the example embodiments of the present application do not mean execution sequences. The execution sequences of the steps should be determined according to functions and internal logic of the steps, but should not be construed as any limitation on the implementation processes of the example embodiments of the present application.

Figure 3:
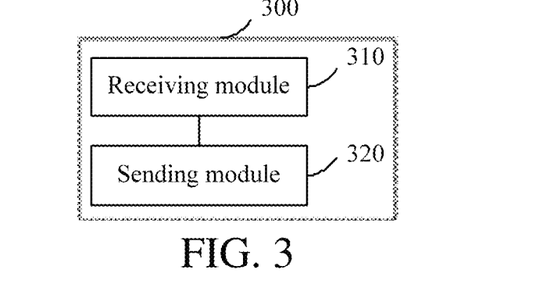
FIG. 3 is an example structural block diagram of a communication node for D2D direct communication according to an embodiment of the present application.

An embodiment of the present application further provides a communication node that can execute the foregoing communication method for D2D direct communication. When executing the communication method for D2D direct communication in the embodiment of the present application, the communication node is the first node. As shown in FIG. 3, the communication node 300 comprises:

a receiving module 310, configured to receive an interference signal from an interference node; and a sending module 320, configured to send the interference signal and a to-be-sent signal in a manner in which the interference signal and the to-be-sent signal can be received by at least one second node.

The interference signal is a signal that is from the interference node and received by the communication node 300 in a radio resource for sending the interference signal and the to-be-sent signal. The at least one second node can receive, in the radio resource, the interference signal and the to-be-sent signal sent by the communication node 300, and can also receive the interference signal from the interference node. The interference signal and the to-be-sent signal sent by the communication node 300 may be used for interference elimination or the like at the second node.

It should be noted that, the communication node in this embodiment of the present application is at least in a full-duplex mode in the radio resource for sending the interference signal and the to-be-sent signal (assuming that the communication node has a transmit antenna and a receive antenna), so as to simultaneously transmit and receive a signal in a same radio resource, that is, receive the interference signal while sending a signal to the second node, thereby effectively improving the spectrum efficiency. In addition, to reduce a processing delay, after receiving the interference signal, the first node does not decode the interference signal.

The communication node in this embodiment of the present application acquires an interference signal, and sends the interference signal and a to-be-sent signal to a receiver of the D2D communication, to cause interference to be eliminated at the receiver, thereby effectively reducing interference of a cellular network on the D2D communication. When the communication node in this embodiment of the present application is used for the D2D communication, a base station resource (for example, coordinating interference between a D2D link and a cellular network) does not need to be consumed, signaling interactions are fewer, and user performance of the cellular network is not reduced, which help to improve the resource utilization.

Figure 4:
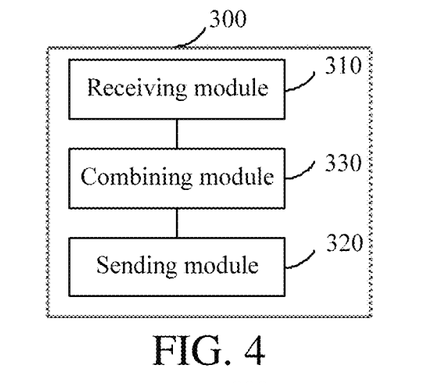
FIG. 4 is an example structural block diagram of another communication node for D2D direct communication according to an embodiment of the present application.

To better implement interference elimination or the like at the second node, as shown in FIG. 4, the communication node 300 in this embodiment of the present application further comprises:

a combining module 330, configured to combine the interference signal and the to-be-sent signal.

During combining, by the combining module 330, the interference signal and the to-be-sent signal, a transmit power of the first node and a SINR at the second node may be comprehensively considered. The sending module 320 sends a signal obtained by the combining module 330, in a manner in which the obtained signal can be received by at least one second node.

Figure 5:
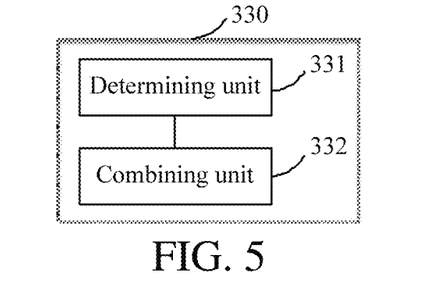
FIG. 5 is an example structural block diagram of a possible implementation of a combining module in a communication node for D2D direct communication according to an embodiment of the present application.

In a possible implementation, as shown in FIG. 5, the combining module 330 further comprises:

a determining unit 331, configured to separately determine a first channel characteristic $h_{12}$ of a first channel between the interference node and the communication node 300, a second channel characteristic $h_{13}$ of at least one second channel between the interference node and the at least one second node, and a third channel characteristic $h_{23}$ of at least one third channel between the communication node and the at least one second node, where the channel characteristic at least comprises a channel impulse response; and a combining unit 332, configured to combine the interference signal and the to-be-sent signal according to the first channel characteristic, the second channel characteristic, and the third channel characteristic.

In the communication node in this embodiment of the present application, under the condition of satisfying a maximum transmit power constraint of the first node, the combining unit 332 may design combination weights of the interference signal and the to-be-sent signal according to the first channel characteristic $h_{12}$, the second channel characteristic $h_{13}$, and the third channel characteristic $h_{23}$, so as to obtain a maximum SINR of the at least one second node.

The determining unit 331 may determine a corresponding channel characteristic by using a common channel estimation algorithm in the field, and may also acquire a corresponding channel characteristic from a direct channel user.

Figure 6:
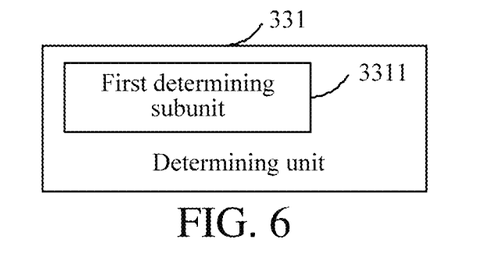
FIG. 6 is an example structural block diagram of a possible implementation of a determining unit of a combining module in a communication node for D2D direct communication according to an embodiment of the present application.

In a possible implementation, in the downlink interference scenario shown in FIG. 1(*a*), a UE2 is the communication node in this embodiment of the present application, a UE3 is the second node, and an interference node is the base station BS1. For the first channel characteristic $h_{12}$, the UE2 and the base station BS1 are direct users of the first channel, and the UE2 may determine the first channel characteristic $h_{12}$ by receiving a pilot signal of the base station BS1 to perform channel estimation. That is, as shown in FIG. 6, the determining unit 331 comprises:

a first determining subunit 3311, configured to determine the first channel characteristic $h_{12}$ according to a pilot signal from the base station.

Figure 7:
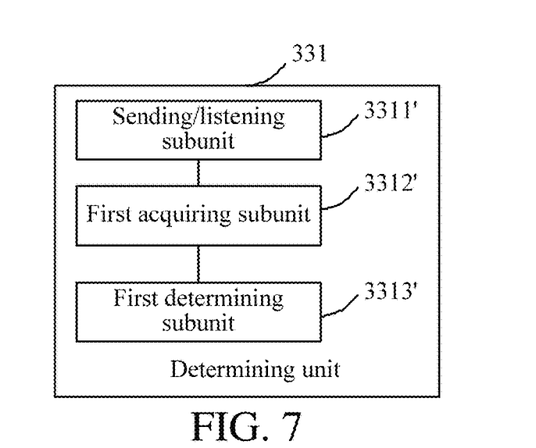
FIG. 7 is an example structural block diagram of a second possible implementation of a determining unit of a combining module in a communication node for D2D direct communication according to an embodiment of the present application.

In another possible implementation, in the uplink interference scenario shown in FIG. 1(*b*), a UE2 is the communication node in this embodiment of the present application, a UE3 is the second node, and an interference node is another UE, namely, a UE1 shown in the figure, within a coverage range of the base station BS1. In this case, before performing D2D communication, the UE2 and the UE3 need to determine the interference node possibly interfering with the UE2 and the UE3, and determine each channel characteristic after determining the interference node. The UE2 may determine the interference node by directly querying the base station, and then perform channel estimation; or only perform channel estimation by using a received signal from the interference node without determining the interference node. Correspondingly, as shown in FIG. 7, the determining unit 331 may comprise a sending/listening subunit 3311', a first acquiring subunit 3312', and a first determining subunit 3313'.

The sending/listening subunit 3311' is configured to send a request to a base station BS1 of the cellular network or listen for scheduling information of a base station BS1.

Because the D2D communication is controlled by a base station, a resource used in the D2D communication is allocated by the base station. Therefore, to determine the interference node and further determine the channel characteristic, the UE2 may send the request to the base station by using the sending/listening subunit 3311' or listen for the scheduling information, of the base station BS1, in a radio resource occupied by the D2D communication, so as to acquire related information that can be used to determine the interference node.

The first acquiring subunit 3312' is configured to acquire a reference signal parameter of a possible interference node.

The first acquiring subunit 3312' can learn the reference signal parameter by acquiring the scheduling information, obtained by listening, of the base station BS1; or in response to the request of the UE2, the base station BS1 may send the reference signal parameter of the interference node to the UE2. The UE2 receives a reference signal of the interference node according to the parameter, and further performs channel estimation according to the reference signal. An example is used, but does not intend to constitute any limitation: The reference signal may be an SRS in an LTE system, where the reference signal is a high-bandwidth sounding signal transmitted by the UE to the base station. Before sending an uplink signal to the base station, the UE sends an SRS to the base station according to an SRS parameter (comprising a sending cycle, frequency, or the like) specified by the base station; and the base station performs demodulation, channel state estimation, or the like according to the received SRS, so as to perform uplink scheduling. The first acquiring subunit 3312' acquires the SRS parameter sent by the base station.

The first determining subunit 3313' is configured to receive a reference signal from the interference node according to the parameter, and determine the first channel characteristic $h_{12}$ according to the reference signal.

For example, a signal received by the first determining subunit 3313' in a corresponding time-frequency resource according to the received SRS parameter is an SRS of the interference node, and the first determining subunit 3313' performs channel estimation according to the SRS to determine the first channel characteristic $h_{12}$.

It should be noted that, in a case in which the interference node is another UE, the reference signal parameter may also be acquired by the second node, and the first acquiring subunit 3312' directly acquires the parameter from the second node.

Figure 8:
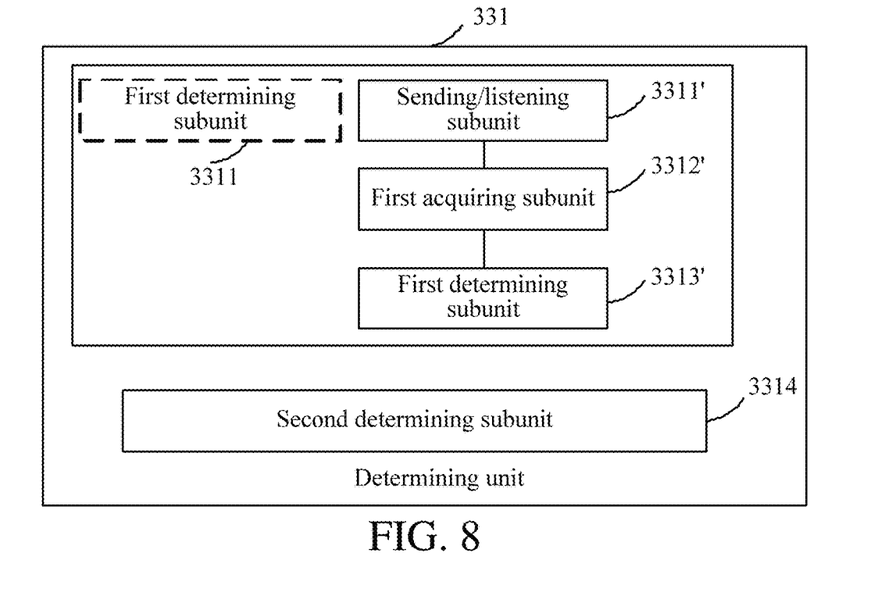
FIG. 8 is an example structural block diagram of a third possible implementation of a determining unit of a combining module in a communication node for D2D direct communication according to an embodiment of the present application.

For the second channel characteristic $h_{13}$, the interference node and the at least one second node are direct users of the second channel, the communication node 300 in this embodiment of the present application may directly acquire the second channel characteristic $h_{13}$ from the second node after the second node determines the second channel characteristic $h_{13}$. Correspondingly, as shown in FIG. 8, in addition to the units shown in FIG. 6 or FIG. 7, the determining unit 331 may further comprise:

a second determining subunit 3314, configured to acquire at least ones second channel characteristic $h_{13}$ from the at least one second node.

Figure 9:
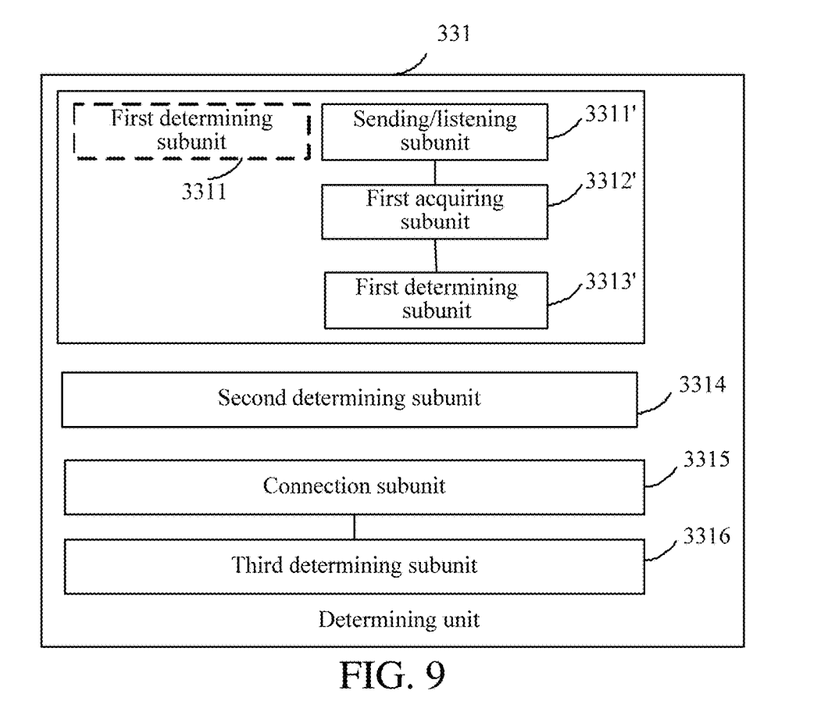
FIG. 9 is an example structural block diagram of a fourth possible implementation of a determining unit of a combining module in a communication node for D2D direct communication according to an embodiment of the present application.

For the third channel characteristic $h_{23}$, the communication node 300 in this embodiment and the corresponding second node are direct users of the third channel. Because the communication node 300 and the corresponding second node are a D2D communication pair, after establishing a D2D connection, the communication node 300 may perform channel estimation according to a signal from the second node. As shown in FIG. 9, the determining unit 331 further comprises:

a connection subunit 3315, configured to establish a connection between the communication node 300 and the at least one second node; and a third determining subunit 3316, configured to determine the third channel characteristic $h_{23}$.

Figure 10:
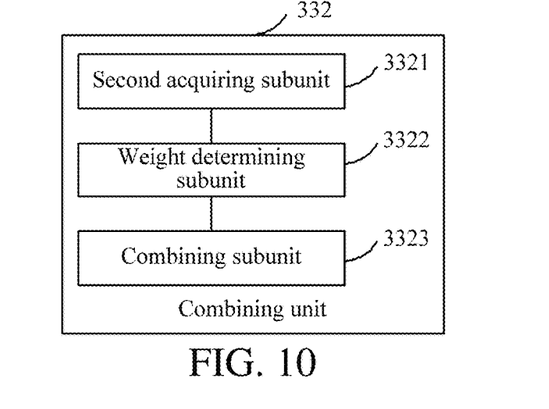
FIG. 10 is an example structural block diagram of a possible implementation of a combining unit of a combining module in a communication node for D2D direct communication according to an embodiment of the present application.

The combining unit 332 may determine the weights of the interference signal and the to-be-sent signal according to the foregoing formulas (1) to (2). As shown in FIG. 10, the combining unit 332 may comprise:

a second acquiring subunit 3321, configured to acquire a maximum transmit power $P_1$ of the interference signal;

a weight determining subunit 3322, configured to determine weights of the interference signal and the to-be-sent signal according to the maximum transmit power $P_1$ of the interference node, the maximum transmit power $P_2$ of the first node, the first channel characteristic $h_{12}$, the second channel characteristic $h_{13}$, and the third channel characteristic $h_{23}$; and a combining subunit 3323, configured to combine the interference signal and the to-be-sent signal according to the weights determined by the weight determining subunit.

Regardless of whether the interference node is the base station or another UE, the communication node 300 may directly acquire $P_1$ from the base station; and therefore, the second acquiring subunit 3321 acquires the maximum transmit power $P_1$ by receiving the maximum transmit power $P_1$ of the interference signal from a base station of a cellular network.

After the combining subunit 3323 combines the interference signal and the to-be-sent signal according to the weights, the sending module 320 may send a combined signal to the corresponding second node.

It should be noted that, in the communication node in this embodiment of the present application, the sending function of the units and/or modules may be performed by a same module having the sending function, and the receiving function of the units and/or modules may be performed by a same module having the receiving function.

Figure 11:
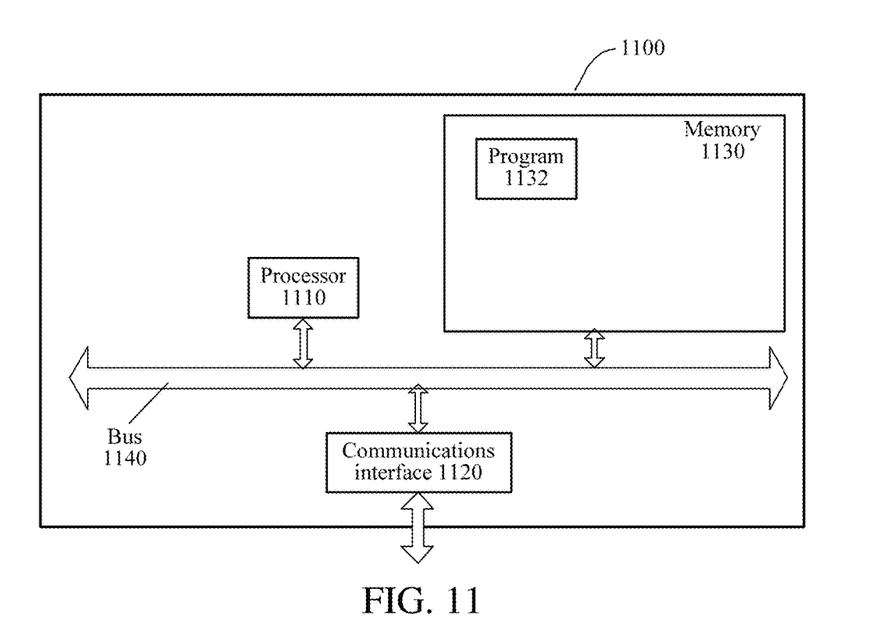
FIG. 11 is an example structural block diagram of still another communication node for D2D direct communication according to an embodiment of the present application.

FIG. 11 is a schematic structural diagram of still another communication node 1100 for D2D direct communication according to an embodiment of the present application. Example embodiment of the communication node 1100 is not limited in a specific embodiment of the present application. As shown in FIG. 11, the communication node 1100 may comprise:

a processor 1110, a communications interface 1120, a memory 1130, and a communications bus 1140.

The processor 1110, the communications interface 1120, and the memory 1130 communicate with each other by using the communications bus 1140.

The communications interface 1120 is configured to communicate with a network element, for example, a client.

The processor 1110 is configured to execute a program 1132, and may specifically execute related steps in the foregoing method embodiment.

Specifically, the program 1132 may comprise program code, and the program code comprises a computer operation instruction.

The processor 1110 may be a central processing unit (CPU), an application specific integrated circuit (ASIC), or one or more integrated circuits configured to implement the embodiments of the present application.

The memory 1130 is configured to store the program 1132. The memory 1130 may comprise a high-speed RAM memory, and may also comprise a non-volatile memory, for example, at least one disk memory. The program 1132 may be specifically used to enable the communication node 1100 to perform the following steps:

receiving, by a first node, an interference signal from an interference node; and sending, by the first node, the interference signal and a to-be-sent signal in a manner in which the interference signal and the to-be-sent signal can be received by at least one second node.

For the steps in the program 1132, reference may be made to corresponding descriptions of corresponding steps and units in the foregoing embodiments, and details are not described herein again. It may be clearly understood by a person skilled in the art that, for the purpose of convenient and brief description, for a detailed working processes of the foregoing device and module, reference may be made to a corresponding process in the foregoing method embodiment, and details are not described herein again.

A person of ordinary skill in the art may be aware that, in combination with the examples described in the embodiments disclosed in this specification, units and method steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and are sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a server, a network device, or the like) to perform all or a part of the steps of the method described in the embodiment of the present application. The foregoing storage medium comprises: any mediums that can store program code, such as a USB flash drive, a removable hard disk, a read-only memory (ROM), a random access memory (RAM), a magnetic disk, or an optical disc.

The foregoing example embodiments are merely used for describing the present application, but are not intended to limit the present application. A person of ordinary skill in the art may make various changes and variations without departing from the spirit and scope of the present application; therefore, all equivalent technical solutions fall within the scope of the present application, and patent protection scope of the present application shall be subject to the claims.

What is claimed is:

1. A method, comprising:
    receiving, by a first node comprising a processor, an interference signal from an interference node;
    combining, by the first node, the interference signal and a to-be-sent signal into a combined signal; and
    sending, by the first node, the combined signal in a manner in which the combined signal is receivable by at least one second node,
    wherein the first node is at least in a full-duplex mode in a radio resource for sending the combined signal, and
    wherein the at least one second node is configured to receive, in the radio resource, the combined signal sent by the first node, and receive the interference signal from the interference node.

2. The method of claim 1, wherein the combining the interference signal and the to-be-sent signal comprises:
    separately determining, by the first node, a first channel characteristic of a first channel between the interference node and the first node, a second channel characteristic of at least one second channel between the interference node and the at least one second node, and a third channel characteristic of at least one third channel between the first node and the at least one second node; and
    combining, by the first node, the interference signal and the to-be-sent signal according to the first channel characteristic, the second channel characteristic, and the third channel characteristic.

3. The method of claim 2, wherein the interference node is a base station device of a cellular network.

4. The method of claim 3, wherein the determining, by the first node, the first channel characteristic comprises:
    determining, by the first node, the first channel characteristic according to a pilot signal from the base station device.

5. The method of claim 2, wherein the interference node is a user equipment (UE) of a cellular network.

6. The method of claim 5, wherein the determining, by the first node, the first channel characteristic comprises:
    sending, by the first node, a request to a base station device of the cellular network;

acquiring a reference signal parameter of the interference node;

receiving a reference signal from the interference node according to the reference signal parameter; and determining the first channel characteristic according to the reference signal.

7. The method of claim 2, wherein the determining, by the first node, the second channel characteristic comprises:

acquiring at least one second channel characteristic from the at least one second node.

8. The method of claim 2, wherein the combining the interference signal and the to-be-sent signal comprises, under the condition of satisfying a maximum transmit power constraint of the first node, combining the interference signal and the to-be-sent signal to obtain a maximum signal to interference plus noise ratio (SINR) at the at least one second node.

9. The method of claim 8, wherein the combining the interference signal and the to-be-sent signal comprises:

acquiring a maximum transmit power of the interference node;

determining weights of the interference signal and the to-be-sent signal according to the maximum transmit power of the interference node, another maximum transmit power of the first node, the first channel characteristic, the second channel characteristic, and the third channel characteristic; and combining the interference signal and the to-be-sent signal according to the weights.

10. The method of claim 9, wherein the acquiring the maximum transmit power of the interference signal comprises:

receiving the maximum transmit power of the interference signal from a base station device of a cellular network.

11. The method of claim 9, wherein during the determining the weights of the interference signal and the to-be-sent signal, the weights are determined according to the following formulas:

$$|w_1| = \frac{A + D - \sqrt{(A+D)^2 - \frac{AC^2}{B}}}{C} \text{ and}$$

$$|w_2| = \sqrt{P_2 - |w_1^*|(P_1|h_{12}|^2 + s_I^2 + s_n^2)}$$

where, $A = P_2|h_{23}|^2$ $B = |P_1|h_{12}|^2|h_{23}|^2 + |h_{23}|^2(s_I^2 + s_n^2)$ $C = 2P_1|h_{12}||h_{13}||h_{23}|$ $D = P_1|h_{13}|^2 + s_n^2$ and $h_{12}$ is the first channel characteristic, $h_{13}$ is the second channel characteristic, $h_{23}$ is the third channel characteristic, $w_1$ is a first weight of the interference signal, $w_2$ is a second weight of the to-be-sent signal, $P_1$ is the maximum transmit power of the interference node, $P_2$ is the other maximum transmit power of the first node, $\sigma_I^2$ is a zero mean variance when self-interference modeling of the first node is additive white Gaussian noise, and $\sigma_n^2$ is another zero mean variance of other additive white Gaussian noise of the channel between the first node and the interference node.

12. The method of claim 2, wherein the separately determining, by the first node, the first channel characteristic of the first channel between the interference node and the first node, the second channel characteristic of the second channel between the interference node and the at least one second node, and the third channel characteristic of the third channel between the first node and the at least one second node comprises:

establishing, by the first node, a connection to the at least one second node; and determining, by the first node, the third channel characteristic.

13. The method of claim 1, wherein the interference signal is a signal that is from the interference node and received by the first node in the radio resource for the sending combined signal.

14. The method of claim 2, wherein the channel characteristic comprises a channel impulse response.

15. A communication node, comprising:

a memory that stores executable modules; and a processor, coupled to the memory, that executes or facilitates execution of the executable modules, comprising:

a receiving module configured to receive an interference signal from an interference node;

a combining module configured to combine the interference signal and a to-be-sent signal resulting in a combined signal; and a sending module configured to send the combined signal in a manner in which the combined signal are receivable by at least one second node, wherein the first node is at least in a full-duplex mode in a radio resource for sending the combined signal, and wherein the at least one second node is configured to receive, in the radio resource, the combined signal sent by the first node, and receive the interference signal from the interference node.

16. The communication node of claim 15, wherein the combining module comprises:

a determining unit configured to separately determine a first channel characteristic of a first channel between the interference node and the communication node, a second channel characteristic of at least one second channel between the interference node and the at least one second node, and a third channel characteristic of at least one third channel between the communication node and the at least one second node; and a combining unit configured to combine the interference signal and the to-be-sent signal according to the first channel characteristic, the second channel characteristic, and the third channel characteristic.

17. The communication node of claim 16, wherein the interference node is a base station device of a cellular network.

18. The communication node of claim 17, wherein the determining unit comprises:

a first determining subunit configured to determine the first channel characteristic according to a pilot signal from the base station device.

19. The communication node of claim 16, wherein the interference node is a user equipment (UE) of a cellular network.

20. The communication node of claim 19, wherein the determining unit comprises:

a sending/listening subunit configured to send a request to a base station device of the cellular network or listen for scheduling information of the base station device;

a first acquiring subunit configured to acquire a reference signal parameter of the interference node; and
a first determining subunit configured to receive a reference signal from the interference node according to the reference signal parameter, and determine the first channel characteristic according to the reference signal.

21. The communication node of claim 16, wherein the determining unit comprises:
a second determining subunit configured to acquire at least one second channel characteristic from the at least one second node.

22. The communication node of claim 16, wherein under a condition of satisfying a maximum transmit power constraint of the communication node, the combining unit combines the interference signal and the to-be-sent signal to obtain a maximum signal to interference plus noise ratio (SINR) at the at least one second node.

23. The communication node of claim 22, wherein the combining unit comprises:
a second acquiring subunit configured to acquire a maximum transmit power of the interference node;
a weight determining subunit configured to determine weights of the interference signal and the to-be-sent signal according to the maximum transmit power of the interference node, another maximum transmit power of the first node, the first channel characteristic, the second channel characteristic, and the third channel characteristic; and
a combining subunit configured to combine the interference signal and the to-be-sent signal according to the weights determined by the weight determining subunit.

24. The communication node of claim 23, wherein the second acquiring subunit receives the maximum transmit power of the interference signal from a base station device of a cellular network.

25. The communication node of claim 23, wherein the weight determining subunit determines the weights according to the following formulas:

$$|w_1^*| = \frac{A + D - \sqrt{(A+D)^2 - \frac{AC^2}{B}}}{C} \text{ and}$$

$$|w_2^*| = \sqrt{P_2 - |w_1^*|(P_1|h_{12}|^2 + s_I^2 + s_n^2)}$$

where, $A = P_2|h_{23}|^2$ $B = |P_1|h_{12}|^2|h_{23}|^2 + |h_{23}|^2(s_I^2 + s_n^2)$ $C = 2P_1|h_{12}||h_{13}||h_{23}|$ $D = P_1|h_{13}|^2 + s_n^2$ and $h_{12}$ is the first channel characteristic, $h_{13}$ is the second channel characteristic, $h_{23}$ is the third channel characteristic, $w_1$ is a weight of the interference signal, $w_2$ is another weight of the to-be-sent signal, $P_1$ is a maximum transmit power of the interference node, $P_2$ is another maximum transmit power of the communication node, $\sigma_I^2$ is a zero mean variance when self-interference modeling of the communication node is additive white Gaussian noise, and $\sigma_n^2$ is another zero mean variance of other additive white Gaussian noise of the channel between the communication node and the interference node.

26. The communication node of claim 16, wherein the determining unit comprises:
a connection subunit configured to establish a connection between the communication node and the at least one second node; and
a third determining subunit configured to determine the third channel characteristic.

27. A computer readable storage device, comprising at least one executable instruction, which, in response to execution, causes a system comprising a processor to perform operations, comprising:
receiving, by a first node, an interference signal from an interference node;
combining, by the first node, the interference signal and a to-be-sent signal into a combined signal; and
sending, by the first node, the combined signal in a manner enabling the combined signal to be received by at least one second node,
wherein the first node is at least in a full-duplex mode in a radio resource for sending the combined signal, and
wherein the at least one second node is configured to receive, in the radio resource, the combined signal sent by the first node, and receive the interference signal from the interference node.

28. A device for device-to-device (D2D) direct communication, comprising a processor and a memory, wherein the memory stores executable instructions, the processor being connected with the memory via a communication bus, and when the device is operating, the processor executes or facilitates execution of the executable instructions stored by the memory to cause the device to perform operations, comprising:
receiving, by a first node, an interference signal from an interference node;
combining, by the first node, the interference signal and a to-be-sent signal into a combined signal; and
sending, by the first node, the combined signal in a manner facilitating receipt of the combined signal by at least one second node,
wherein the first node is at least in a full-duplex mode in a radio resource for sending the combined signal, and
wherein the at least one second node is configured to receive, in the radio resource, the combined signal sent by the first node, and receive the interference signal from the interference node.

29. The device of claim 28, wherein the operations further comprise:
separately determining, by the first node, a first channel characteristic of a first channel between the interference node and the first node, a second channel characteristic of at least one second channel between the interference node and the at least one second node, and a third channel characteristic of at least one third channel between the first node and the at least one second node; and
combining, by the first node, the interference signal and the to-be-sent signal according to the first channel characteristic, the second channel characteristic, and the third channel characteristic.

30. The device of claim 29, wherein the interference node is a base station device of a cellular network.

31. The device of claim 30, wherein the determining, by the first node, the first channel characteristic comprises:
    determining, by the first node, the first channel characteristic according to a pilot signal from the base station device.

32. The device of claim 29, wherein the interference node is a user equipment of a cellular network.

\* \* \* \* \*